March 21, 1967 R. D. CAVANAUGH 3,310,263
GRAVITY-SENSITIVE LEVELLING
Filed March 4, 1965 2 Sheets-Sheet 1
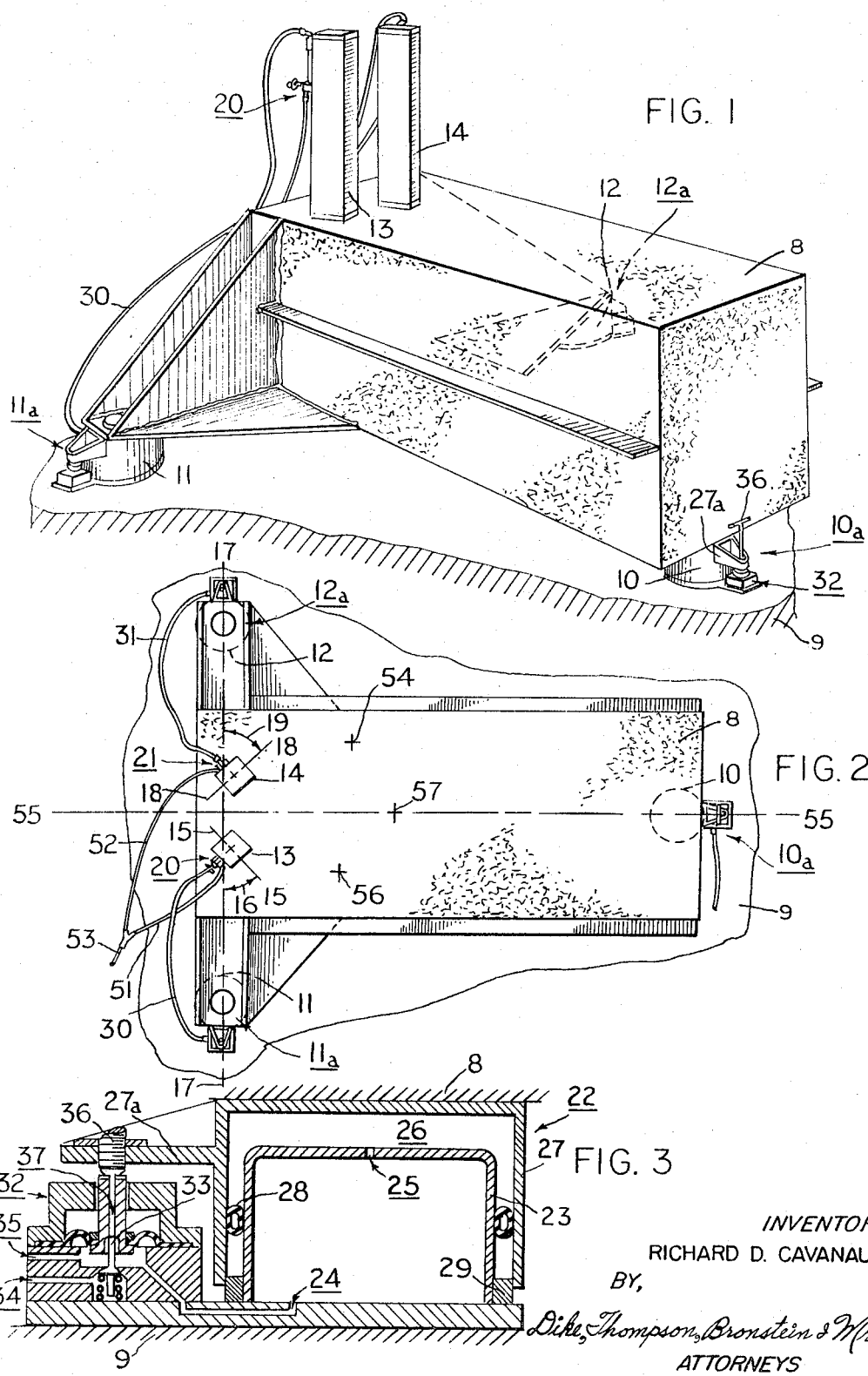
INVENTOR
RICHARD D. CAVANAUGH
BY,
Dike, Thompson, Bronstein & Mrose
ATTORNEYS March 21, 1967   R. D. CAVANAUGH   3,310,263
GRAVITY-SENSITIVE LEVELLING
Filed March 4, 1965   2 Sheets-Sheet 2

INVENTOR
RICHARD D. CAVANAUGH
BY,
Dike, Thompson, Bronstein & Mrose
ATTORNEYS

United States Patent Office 3,310,263
Patented Mar. 21, 1967

3,310,263
GRAVITY-SENSITIVE LEVELLING
Richard D. Cavanaugh, Medfield, Mass., assignor to Barry Wright Corporation, Watertown, Mass., a corporation of Massachusetts
Filed Mar. 4, 1965, Ser. No. 437,246
19 Claims. (Cl. 248—23)

The present invention relates to improvements in the levelling of dynamically-supported loads and, in one particular aspect, to novel and improved vibration-isolating fluid pressure support systems wherein extraordinarily precise levelling of massive loads is maintained by equipment of uncomplicated low-cost construction which is substantially insensitive to variations in source pressures.

Dynamic support and vibration isolation of loads have heretofore been developed by a variety of types of pressurized mounts in which fluid pressures have been increased and decreased in accordance with the dictates of sensitive control or pilot valves. Equipment of this general character can be designed to react so swiftly and accurately to changes in loading as to preserve an essentially fixed orientation of a load in relation to its supporting foundation even under severe operating conditions, while at the same time isolating the transmissions of vibration and shock between the load and its foundation, damping vibrations of the load, and reducing the effective natural frequency of the supported load. In some instances, however, it is of paramount importance to maintain a fixed orientation of a load in relation to the true horizontal, i.e. precise levelling, rather than a predetermined heightwise relationship to a foundation. Unfortunately, it is found that even the most rigid foundations tend to exhibit minute but nevertheless significant dimensional variations or distortions induced by such factors as temperature variations, nearby loading changes on the underlying terrain, and lunar tidal effects on the earth's surface. These influences cannot be discounted where a very high degree of precision in levelling is required, as in the cases of attitude-sensitive instruments and apparatus which are to be oriented and preserved level with accuracies better than an arc-second. Efforts aimed at making the foundation and support structure more sturdy and inflexible are found to introduce undesirable bulk and mass which render them even more susceptible to the disturbing influences, and known prior attempts to orient the support structure with gravity sensors have involved highly complex systems in which errors have tended to be cumulative and have prevented the desired refinements of accuracy from being realized. In accordance with the present teachings, however, such difficulties are successfully overcome economically and with remarkable simplicity and technical nicety, by utilizing gravity-responsive members as direct pressure-control elements in two fluid-pressurized load mounts in a three-point suspension.

It is one of the objects of the present invention, therefore, to provide novel and improved fluid-pressure apparatus of uncomplicated construction which maintains extremely precise levelling of a load carried upon a distortable substructure by responding to gravitational forces sensed in relation to the load.

Another object is to improve the levelling of a load by directly regulating the fluid pressures in a pair of pressurized mounts in accordance with gravitational measurements related to orientations of the load.

A further object is to provide unique and economical equipment wherein a three-point suspension for a load includes two pressurized-fluid mounts each separately pressurized directly in accordance with the differently-directed displacements of highly-damped gravity-responsive apparatus carried by the load.

Still further, it is an object to provide dynamic load-supporting, isolating and precision levelling apparatus including three pressurized-fluid mounts, one of which is height-responsive and the others of which are under direct control of the displacements from vertical of damped pendulous valving members mounted for orientations by the load.

It is yet another object to provide unique fluid-pressure systems for the accurate levelling of loads wherein pressures are regulated with extraordinary precision by damped pendulous apparatus mounted for movement with the loads and wherein source pressure variations within wide ranges are incapable of inducing error.

And, it is an additional object to provide novel pressure-regulating apparatus for pressurized-fluid levelling equipment wherein a massive highly-damped pendulous member uniquely functions as a movable valving element in cooperation with a fluid-discharge orifice which is fixedly oriented in relation to a load.

By way of a summary account of practice of this invention in one of its aspects, a massive load is supported at three spaced points upon a sub-structure which is subject to deformations, the support provisions each being in the form of a pressurized-air mount. These mounts, disposed in a triangular array, isolate and elevate the load in a location slightly above the supporting deformable sub-structure, such as a concrete floor, when pressurized by a suitable air source through automatically-adjusted valving units. One of these valving units detects heightwise displacements of one part of the load from a predetermined orientation in relation to the sub-structure, and preserves the predetermined orientation by appropriately increasing or decreasing the pressures within one of the mounts located at substantially the same site. Each of the other two mounts has its air pressure from a common source regulated in accordance with the by-pass valving effects of a different damped pendulous mass which is knife-edge suspended upon the load at a position remote from the first site and is tiltable about a different axis to characterize the departures of that mount from an operating condition wherein it preserves the portion of the load at its site in a substantially perfectly levelled relation to the portion of the load at the first site. These valving effects are produced by a planar valving surface fixed with the movable pendulous mass and disposed in closely-spaced relation to an air-discharging orifice or nozzle held fixedly by ethe load.

Although the aspects of this invention which are believed to be novel are set forth in the appended claims, additional details as to preferred practices of the invention and as to the further objects, advantages and features thereof may be most readily comprehended through reference to the following description taken in connection with the accompanying drawings wherein:

FIGURE 1 is an illustration in perspective of precision-levelling apparatus constructed in accordance with teachings of the present invention;

FIGURE 2 provides a plan view of the apparatus of FIGURE 1;

FIGURE 3 depicts, in cross-section, details of a variably-pressurized air mount which may be used for isolated support of the load portrayed in FIGURES 1 and 2;

Figures 4, 6, 7:
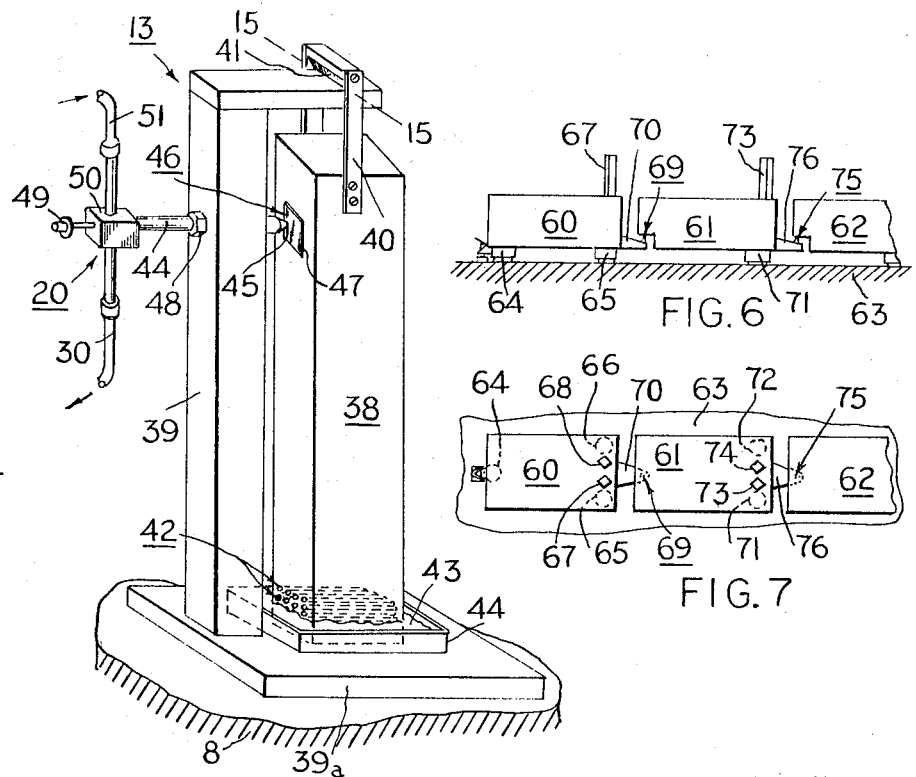
FIGURE 4 is a pictorial representation of a highly-damped knife-edge-suspended pendulous controller of fluid pressure in the improved levelling system.

FIGURE 6 presents a side view of a multiple array of levelling units in which certain of the units provide support references for others; and FIGURE 7 is a plan view of the array of FIGURE 6.

The arrangement illustrated pictorially in FIGURES 1 and 2 includes a massive load unit 8, shown in the form of a 2½-ton concrete block reinforced with steel structural members, which is suspended upon a substructure 9 in the form of concrete flooring or the like. This load may itself comprise apparatus which is to be maintained accurately level in use, or it may instead serve as a platform or reference upon which devices such as sensitive instruments are to be mounted for operation or testing. A three-point suspension upon the sub-structure 9 is provided by the substantially fixed-height mount 10 and by two cooperating spaced mounts 11 and 12 which, as is described later herein, are automatically regulated to preserve a precisely-levelled relationship with reference to the heightwise orientation established by the fixed mount 10. When isolation between the load and sub-structure is not a critical factor, the fixed-height mount at site 10a may comprise a purely mechanical suspension, such as a common ball-and-socket type coupling, or a jack. Preferably, however, this mount is of a known vibration- and shock-isolating type wherein the pressures of air supplied to a vertically-expansible chamber are varied by a control valve which responds to even the most minute departures of relatively movable parts of the chamber from a predetermined orientation. Alternately, pressurized fluids other than air may be involved, such as the liquid in a hydraulic type. The other two mounts (11 and 12), at sites 11a and 12a in the triangular array, are of the pressurized-fluid type and serve to elevate and lower the nearby portions of the load as dictated by the requirement for strict levelling in relation to the load orientation established at site 10a by the height-controlling mount 10. For these purposes, levelling conditions are sensed by gravitationally-responsive apparatus, shown in the preferred form of a pair of highly-damped pendulum control units 13 and 14 which cooperate with the mounts 11 and 12, respectively. Each of the enclosed control units 13 and 14 includes a heavy pendulous mass which is free to tilt about an axis defined by a knife-edge suspension upon a support bracket carried by and movable with the load. Knife-edge suspensions offer substantially frictionless support for the pendulous masses, and thereby render the suspension errors negligible. In FIGURE 2, the axis 15—15 about which the pendulous mass of control unit 13 tilts is shown to be inclined obliquely by an angle 16 in relation to the line 17—17 along which the mounts 11 and 12 are aligned, and is nearer to mount 11 than it is to mount 12; similarly, the tilt axis 18—18 for the pendulous mass of control unit 14 is preferably inclined obliquely by a like angle 19 in relation to the same line and is disposed nearer mount 12. Both control units are preferably located at about the same relatively large distance from fixed-height mount 10, where they will respond well to changes in level of the supporting load. As is described in greater detail hereinafter, each of the control units 13 and 14 advantageously functions directly as a pressure-controlling device, by variably orienting a pendulum-mounted plate in its closure relationships to a fluid-discharge opening, such as that appearing at the end of a nozzle. Nozzle structures 20 and 21 in control units 13 and 14, respectively, are disposed to respond to the pendulum tiltings in senses which promote the desired precise levelling actions by the levelling mounts 11 and 12, respectively.

Understandings of typical mount and pendulum control unit characteristics facilitate a consideration of basic system operation; in this connection, reference is next made to the constructions depicted in FIGURES 3 and 4. Isolating mount 22 in FIGURE 3 is of a known type wherein a damping chamber member 23 is supplied with air under pressure via a supply conduit 24 and in turn delivers the air through a damping orifice 25 to a support chamber 26 defined between member 23 and telescoped piston member 27, the flexible ring seal 28 serving to preserve sealing and to permit the required relative heightwise movements between these members. Alternatively, a diaphragm may be substituted for ring 28. Annular member 29 guides such movements. Depending upon the air pressures appearing in chamber 26 at any instant, greater or lesser thrusts will be exerted between the structures 8 and 9. So much of the mount construction as has thus far been described is common to the fixed-height mount 10 and the two levelling mounts 11 and 12. When operated as one of the levelling mounts 11 and 12, air pressure is supplied directly to the supply conduit 24 of mount 22 from one of the nozzle structures, 20 or 21, via one of the output air lines, 30 or 31, respectively (FIGURE 2). However, when operated in the manner of the fixed-height mount 10, mount 22 has its supply conduit 24 pressurized by way of an associated height-control valve 32, which has a movable valve member 33 actuated in relation to a seat by a motion-feedback arm 27a extending from piston member 27. Air from a high-pressure source (not shown) is delivered to inlet 34 and reaches conduit 24 under control of the movable valve member 33. Conduit 35 is normally closed, by an air pressure gage, and adjustable stop nut 36 provides a means for setting the height condition of the mount. When the load on the mount increases so that it is no longer balanced by the air pressure in chamber 26, the spring-biased valve member 33 is depressed from its body seat and admits air from the source to conduit 24, thereby providing a compensating pressure increase. Conversely, decreased loading results in opening of the bleed or vent passageway 37, and consequent release of excess pressure in chamber 26.

Control unit 13 is portrayed in FIGURE 4 with its sheet metal cover removed to expose inner structural details; unit 14 is of the same construction. A heavy elongated pendulous mass 38, of steel or the like, is there suspended from a rigid shaped bracket 39 by a yoke 40 which carries a knife-edge support element 41 to provide a substantially frictionless pivotal mounting of the mass about its sensing axis 15—15. Near its lower end, the mass exhibits a plurality of through openings 42, which extend in direction transverse to the axis 15—15 and admit a highly viscous liquid 43, such as a thick viscous silicone liquid, from an open-topped container 44 mounted on the base 39a of bracket 39. Liquid 43 develops a high degree of damping which suppresses tendencies of mass 38 to oscillate in relation to the load 8 by which the control unit is carried. Other damping techniques may of course be exploited. Rigid bracket 39 also serves to orient a nozzle structure 20 which is affixed to it near its upper end and which includes a hollow tubular member 44 having a flat circular orifice at its end 45 so positioned in relation to a surface 46 of a pendulous mass 38 that together they function as a flapper valve. Preferably, this surface is highly flat and polished, and may conveniently comprise the surface of a separately-processed member 47 ground to a precise planar condition, the member 47 then being secured to one side of the pendulous mass at a location where it is essentially perpendicular to the tubular member 44 and to the direction of air flow therefrom. Adjusting nut 48 facilitates the setting of the orifice end 45 of structure 20, in relation to the cooperating surface 46, and control knob 49 adjusts a common type of throttling valve 50 to regulate the size of a passageway for the flow of air from a supply line 51 to the air mount and orifice. Outlet tube 30 senses the air pressures existing in nozzle member 44 and couples such pressures to mount 11. Preferably, the supply line 51, and a comparable supply line 52 (FIGURE 2) to control unit 14, are connected in common to a single source of air pressure (not shown), via source line 53.

The relationship governing the pressure, $P_0$, in one of the levelling mounts, such as mount 11, due to the control exercised by the associated unit 13, is:

$$\frac{P_0(jw)}{X_f(jw)} = \frac{U_p}{1 + jwR_sC_p}$$

where:

$$R_s = \frac{\overline{P}_0^{1/2}}{1500 D_s^2}$$

$$C_p = \left[ \frac{V_0}{\overline{P}_0 + 15} + \frac{A^2}{K_s} \right]$$

$$U_p = \frac{6P_0}{D_n}$$

$K_s$ = stiffness of the expansible mount,
$\overline{P}$ = average working pressure,
$w$ = radian frequency,
$D_n$ = diameter of the orifice at the end 45 of nozzle tube 44,
$D_s$ = effective diameter of the supply passage 51 as regulated by the control valve 50, and
$X_f$ = spacing between the orifice at the end 45 of nozzle tube 44 and the surface 46 on pendulous mass 38.

As the spacing $X_f$ increases, and decreases, the pressurization of the mount decreases and increases, respectively. Specifically, the air under pressure from supply line 53 is forced into mount chamber 26 (FIGURE 3) through the throttling valve 50, and air pressure builds up within that chamber until it is sufficiently large to force air through the orifice at the end of tube 44 at a mass rate of flow equal to the mass rate of flow entering through the line 51 as governed by the throttling valve 50. If surface 46 is disposed nearer the orifice, it restricts the flow from the orifice and thereby causes the mount pressure to increase with resulting elevation of the nearby portion of the load. The ensuing movement of that portion of the load tends to develop a compensatory shift in the spacing between the orifice and pendulum surface; at the same time such movement also affects the other control unit, 14, and these two units are both further responsive to any departures in levelling relative to the fixed-height suspension at site 10a.

If the system of FIGURES 1 and 2 is considered to be initially in a perfectly levelled equilibrium condition, with the load supported at some desired height above the substructure at site 10a, even a minute change in loading caused by addition of a small donwardly-acting force or mass at position 54 will result in very slight downward movement of the left side of load which is greater on the side of the centerline 55—55 where position 54 is located. The pendulous masses in both control units remain substantially fixed in relation to the vertical as established by force of gravity, but the bracket-mounted orifices in these units are both brought closer to the cooperating flapper-valve surfaces on these pendulous masses, with the spacing in the unit 14 being the lesser. Accordingly, both mounts 11 and 12 have their pressures increased somewhat, the pressure in unit 12 being the greater, and the load is thereby maintained level. The effects are of different sense for diminished loading at the same position, or for increased loading or force appearing at a position 56 on the opposite side of the centerline. A loading change which influences both control units similarly, such as a loading change at position 57 along centerline 55—55, causes like increases or decreases in pressurizations of mounts 11 and 12 (if they are dimensionally the same), such that the articulated left end of the load is merely raised or lowered uniformly to preserve levelling. Need for levelling is often precipitated because of physical distortions or other disturbances of the substructure 9, rather than as the result of loading changes; in this connection, the system likewise functions to develop precise levelling actions. Any lowering or raising of the sub-structure which is not exactly the same at all three suspension sites will change the spacings between orifices and flapper-valve surfaces on the pendulous masses by amounts required to alter the levelling-mount pressurizations such that the load is restored to a levelled condition. Extraordinary precision is promoted by the fact that surfaces fixed directly with the pendulous masses serve to produce the control-valving actions, there being no intervening measurement and control equipment which is susceptible to error in the translations of levelling measurements into related changes in mount pressures. Although it is preferred to use the illustrated pairing of control units, 13 and 14, each responding to two different components of load tilting, a composite unit involving a single pendulous mass associated with the two differently-directed orifices may also be exploited with comparable results. Pressures in source line 53 may be permitted to vary, so long as they remain well in excess of the pressures needed to support the load; a normal safety factor would be two times the load pressure.

Figure 5:
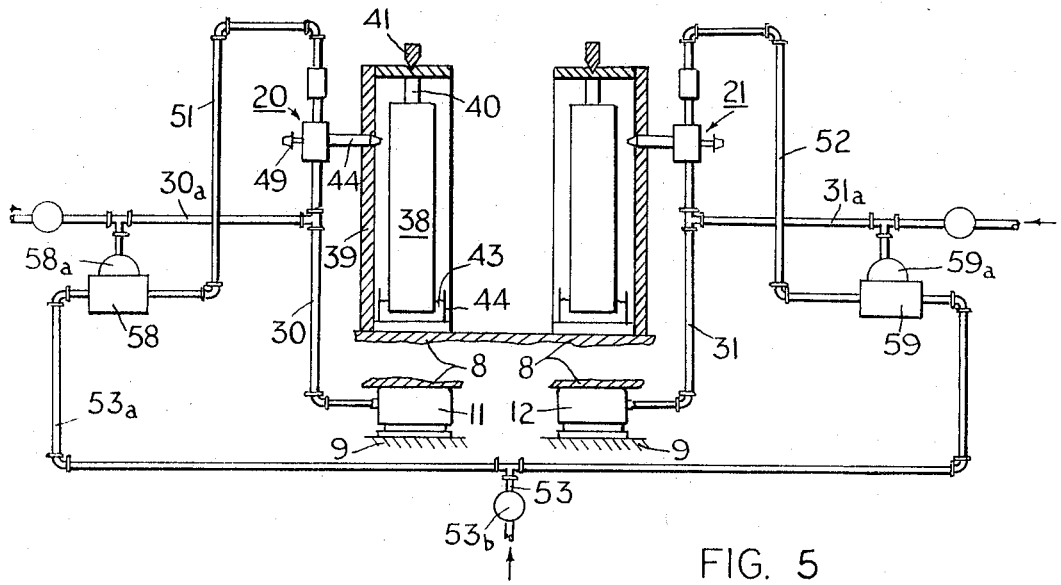
FIGURE 5 illustrates a preferred fluid-pressure system, including boosters, for precision levelling of a load in accordance with the present invention.

The system embodiment represented schematically in FIGURE 5 includes pneumatic booster provisions for augmenting the desired effects; in other respects the arrangement involves essentially the same system and components illustrated in FIGURES 1–4, and the same reference characters are thus used to designate the functionally-equivalent parts. Volume booster relay 58 is seen to have an input connection 53a with the source supply line 53, and is designed to deliver a high volume of flow to the line 51 supplying the pendulous control valve unit 20. This booster responds to signal pressures in the line 30 which supplies the levelling mount 11, the feed-back line tap 30a serving to couple these signal pressures to the bonnet 58a of booster 58. In a known typical construction, such as that of the Model 20 Volume Booster Relay manufactured by Fairchild Stratos Corporation, Babylon, N.Y., the signal pressures applied to bonnet 58a actuate an internal diaphragm and, in turn, controls internal valving (not shown) which accurately causes the output pressures in line 51 to follow the signal pressures in line 30a in accordance with a selected ratio, such as 3:1. Volume booster relay 59 functions in the same manner in improving the responses of levelling mount 12. The pressure system for fixed-height mount 10 is not portrayed in FIGURE 5; it, as well as the two levelling-mount pressure systems, may be supplied with air from the same or different sources, with useful results. Preferably, the sources are pressure-regulated, as by the regulator 53b. A highly important consideration in the suppression of errors is found, in the fact that, with addition of the booster, different magnitudes of loading changes do not cause the pendulous masses of the control units to take up varying positions relative to the associated orifices. This is true because the weight flow of fluid through each orifice then varies directly with the product of air pressure and effective area of the orifice, as directly regulated by the position of the pendulous mass; as the loading increases or decreases, the mount pressures are increased or decreased proportionately, and the very same effective orifice area in each instance causes the load to be given the proper lift by the mount.

There are instances where either a number of individual loads must be preserved level in nearby relationships or where a single load unit must be of such size and mass that it is more convenient to subdivide it into sections. By way of example of the latter, an elongated test bed may be fabricated by arraying a number of smaller test blocks end-to-end, as depicted in FIGURES 6 and 7, where two such blocks, 60 and 61, are shown in association with part of a third, 62. One of these units, 60, corresponds to the load unit 8 in FIGURES 1 and 2, in that it is supported in a level condition upon a substructure, 63, by a fixed-height load mount 64 at one end and by two cooperating levelling mounts 65 and 66 which have their pressurizations regulated by pendulous control units 67 and 68. It should be understood that elements 64–68 correspond to elements 10–14, respectively in the embodiments of FIGURES 1 and 2, and that the connections and modes of operation are the same in both cases. Load block 61 does not utilize a separate fixed-height mount, but, instead, is supported at one point, 69, by a protrusion 70 from the first; the latter protrusion is dynamically maintained in a predetermined levelled relationship with the elevation provided by the fixed-height mount 64 for load block 60. The levelling mounts 71 and 72 which complete the triangular suspension are regulated by pendulous control units 73 and 74, respectively, in the same manner as are elements 65–68, such that both load blocks are preserved level in relation to the same height reference, namely that provided by mount 64. Load block 62 is in turn provided with one point of suspension, 75, upon a protrusion 76 from load block 61, and in addition includes two levelling mounts (not shown) corresponding to mounts 71 and 72. Any desired number of load units may be levelled in accordance with these teachings, and it should be recognized that one point of any load unit may be supported at any point on another load unit which has been levelled. This permits several such load units to be suspended in part from another, and to be arrayed in a variety of patterns wherein all units are in a precisely levelled relationship.

Fluid amplifiers, dampers, filters regulators and boosters may be introduced into the system as needed. In some designs, such as those which operate with liquid fluids or gases other than air, the mounts and control units may be of sealed constructions wherein the exhausted fluids are recirculated rather than merely discharged. As has been mentioned, the two gravity responsive control units used for levelling may be integrated into a single dual-purpose unit wherein a single gravity-responsive mass is movable relative to a pair of nozzles. Orifices and cooperating flapper-valve surfaces may be designed to produce desired valving characteristics, as needed. Accordingly, it should be understood that the embodiments and practices described and portrayed have been presented by way of disclosure, rather than limitation, and that various modifications, substitutions and combinations may be effected without departure from the spirit and scope of this invention in its broader aspects.

I claim:

1. Apparatus for supporting a load on a sub-structure in a predetermined relation to the direction of gravity, comprising a load, a fixed-height mount for supporting said load at a prescribed equilibrium height above the sub-structure at a first point, a first variable-height mount for supporting said load independently of said fixed-height mount above the sub-structure at a second point, a second variable-height mount for supporting said load independently of said fixed-height mount above the sub-structure at a third point, the second and third support points being in a triangular array with the first support point, and control means responsive to gravity mounted in fixed relation to said load actuating said first variable-height mount and said second variable-height mount and preserving said second and third support points of said load in a predetermined relation to the fixed-height support point and to the direction of gravity.

2. Apparatus for supporting a load in a level condition, comprising a load, means for supporting said load at a substantially fixed height above a supporting structure at a first point, at least two adjustable-height mounts for adjustably supporting said load above the supporting structure independently at different ones of two spaced points which are in a triangular relationship with said first point, control means mounted on said load and producing output signals responsive to tilting of said load at said two points from a predetermined relation with said first point, and means responsive to said control means for simultaneously adjusting the height of said adjustable-height mounts in accordance with said output signals and maintaining said two points in said predetermined relationship with said first point.

3. Apparatus for supporting a load in a level condition, comprising a load, dampening means for supporting the load at a substantially fixed height above a supporting structure at a first point, a pair of adjustable-height mounts each including two relatively movable members one of which is adapted to engage the load and the other of which is adapted to engage the supporting structure, said mounts being arranged to support the load above the supporting structure at two spaced points which are in a triangular relationship with said first point, control means for mounting on the load and producing output signals responsive to tilting of the load at said two points from a predetermined relation with said first point, and means responsive to said control means adjusting the spacings between said relatively movable members of each of said mounts in accordance with said output signals, whereby said two points are maintained in said predetermined relationship with said first point.

4. Apparatus for supporting a load, comprising a load, means for supporting said load at a substantially fixed height above a supporting structure at a first point, a pair of fluid-pressure mounts each including two relatively movable members and means for producing relative movements of said members in opposite directions responsive to fluid pressures supplied thereto, said members of said mounts supporting said load on said structure at two spaced points which are in a triangular relationship with said first point, fluid-pressure control means mounted on said load independently regulating the fluid pressure in each of said mounts in response to tilting of said load at said two points from a predetermined relationship with said first point, said control means regulating said pressures to maintain said two points in said predetermined relationship with said first point.

5. Apparatus for supporting a load, comprising a load, means for supporting the load above a supporting structure at a first point, fluid-pressure mounts supporting the load on the structure independently at different ones of two spaced points which are in a triangular relationship with said first point, each of said mounts including two relatively movable members defining a variable-volume chamber responsive to fluid pressures supplied thereto to produce relative movements in opposite directions of said members supporting the load on the supporting structure, source means for supplying fluid under pressure to said mounts, fluid-pressure control means including valving means for independently regulating the fluid pressures in each of said mounts in response to tilting of said control means from a predetermined orientation, means conducting flow of fluid from said source means to each of said mounts through said control means, and means for mounting said control means for tilting movements with the load, said control means regulating the pressures in said mounts by amounts maintaining said two points in a predetermined relationship with said first point which preserves said predetermined orientation of said control means.

6. Apparatus for supporting a load, comprising
a load, means for supporting the load above a supporting structure at a first point,
fluid-pressure mounts supporting the load on the structure independently at different ones of two spaced points which are in a triangular relationship with said first point,
each of said mounts including two relatively movable members defining a variable-volume chamber responsive to fluid pressures supplied thereto to produce relative movement in opposite directions of said members supporting the load on the supporting structure,
source means for supplying fluid under pressure to said mounts,
fluid-pressure control means for regulating the pressures in said mounts to maintain said two support points in a predetermined relationship with respect to said first point, said control means including a support mounted upon said load, gravity-responsive means movable in relation to said support and responsive to the tilting thereof from a predetermined orientation relative to gravity, and valving means for independently regulating the fluid pressure in each of said mounts in response to the tilting of said control means, said valving means including fluid-discharge passageways fixed in relation to said support and having the mass rates of fluid flow therethrough controlled by said gravity-responsive means and means conducting flow of fluid from said source means to each of said mounts through said control means.

7. Apparatus for supporting a load as set forth in claim 6 wherein said flow conducting means comprises means for conducting to different ones of said mounts the fluids in excess of the fluids discharged from the different ones of said fluid-discharge passageways.

8. Apparatus for supporting a load as set forth in claim 7 wherein said source means further comprises booster means independently controlling the mass rates of fluid flow to each of said fluid-discharge passageways.

9. Apparatus for supporting a load, comprising a load, means for supporting the load above a supporting structure at a first point, fluid-pressure mounts supporting the load on the structure independently at different ones of two spaced points which are in a triangular relationship with said first point, each of said mounts including two relatively movable members defining a variable-volume chamber responsive to fluid pressures supplied thereto to produce relative movements in opposite directions of said members supporting the load on the supporting structure, source means for supplying fluid under pressure to said mounts, fluid-pressure control means for regulating the pressures in said mounts to maintain said two support points in a predetermined relationship with respect to said first point, said control means including a support mounted upon said load, pendulous means movable in relation to said support and responsive to tilting thereof from a predetermined orientation, means dampening movements of said pendulous means in relation to said support, and valving means for independently regulating the fluid pressure in each of said mounts in response to the tilting of said control means, said valving means including fluid-discharge passageways fixed in relation to said support and having the mass rates of fluid flow therethrough controlled by proximate cooperating flapper-valve surfaces fixed in relation to said movable pendulous means and means conducting flow of fluid from said source means to each of said mounts through said control means.

10. Apparatus for supporting a load as set forth in claim 9 wherein one of said fluid-discharge pasageways and the cooperating flapper-valve surface therefor are oriented by said support to increase and decrease the mass rate flow of fluid therethrough when one of said two spaced points is raised and lowered, respectively, in relation to said first point, and wherein another of said fluid-discharge passageways and the cooperating flapper-valve surface therefor are oriented by said support to increase and decrease the mass rate flow of fluid therethrough when the other of said two spaced points is raised and lowered, respectively, in relation to said first point.

11. Apparatus for supporting a load as set forth in claim 10 wherein said source means further comprises booster means independently controlling the mass rates of fluid flow to each of said passageways, and wherein said conducting means comprises means conducting fluid from said source means to each of said fluid-discharge passageways through said valve means and conducting to different ones of said mounts the fluids in excess of the fluids discharged from the different ones of said passageways.

12. Apparatus as set forth in claim 5 wherein said means for supporting the load at said first point comprises a third fluid-pressure mount having two relatively movable members defining a variable-volume chamber responsive to fluid pressures supplied thereto to produce relative movements in opposite directions of its said members supporting the load on the supporting structure, and valve means responsive to variations in the heightwise relationships between said members of said third mount controlling the flow of fluid into and out of said chamber of said third mount and thereby preserving a predetermined heightwise relationship between the load and supporting structure at said first point.

13. Apparatus as set forth in claim 5 wherein said means for supporting the load at said first point comprises a second load which supports the first mentioned load at said first point, means for supporting said second load above said supporting structure at a fourth point, a second set of fluid pressure mounts supporting said second load on said supporting structure independently at different ones of two spaced points which are in triangular relationship with said fourth point, each mount of said second set including two relatively movable members defining a variable-volume chamber responsive to fluid pressures supplied thereto to produce relative movements in opposite directions of said members supporting said second load on said supporting structure, second source means for supplying fluid under pressure to the mounts of said second set, second fluid pressure control means including valving means for independently regulating the fluid pressures in each mount of said second set in response to tilting of said second control means from a predetermined orientation, means conducting flow of fluid from said second source means to each mount of said second set through said second control means, and means for mounting said second control means for tilting movements with said second load, 14. Apparatus for supporting a load in a level condition, comprising a load, means for supporting the load at a substantially fixed height above a supporting structure at a first point, at least two fluid-pressure mounts for supporting the load on the structure independently at different ones of two spaced points which are in a triangular relationship with said first point, each of said mounts including two relatively movable members defining a variable-volume chamber responsive to fluid pressures supplied thereto to produce relative movements in opposite directions of said members supporting the load on the supporting structure, source means for supplying fluid under pressure to said mounts, first and second pendulous control means each including a support, a pendulum mounted on said support for tilting movement relative to said support about a tilt axis, and means forming an open-ended fluid-discharge passageway fixed in relation to said support and having the open end thereof disposed to release fluid therefrom in direction substantially perpendicular to said axis and to a proximate substantially planar flapper valve surface fixed with said pendulum, means for mounting said first pendulous means on the load with the pendulum thereof disposed to tilt about the axis thereof primarily in response to tilting movements of one of said two points from predetermined relationships to said first point and to the other of said two points, means for mounting said second pendulous means on the load with the pendulum thereof disposed to tilt about the axis thereof primarily in response to tilting movements of the other of said two points from predetermined relationships to said first point and to the said one of said two points, and means conducting fluid from said source means to different ones of said mounts through different ones of said pendulous control means in fluid communication with the discharge passageways of said control means, said control means regulating the pressures in said mounts by amounts maintaining said two points in a predetermined relationship with said first point which preserves the load level.

15. Apparatus for supporting a load in a level condition as set forth in claim 14 wherein each of said pendulous control means includes a knife-edge suspension mounting the pendulum on the support therefor about the tilt axis thereof, and further includes viscous damping means dampening tilting movements of the pendulum about the tilt axis thereof.

16. Apparatus for supporting a load in a level condition as set forth in claim 14 wherein the pendulum in each of said control means comprises an elongated vertically-extending mass, and wherein each of said control means further comprises a reservoir of viscous damping liquid surrounding at least the lower end of the pendulum thereof to damp tilting movements thereof.

17. Apparatus for supporting a load in a level condition as set forth in claim 14 wherein the pendulum in each of said control means comprises an elongated vertically-extending mass, and wherein said means forming an open-ended discharge passageway in each of said control means comprises a tubular nozzle, and adjustable means mounting said nozzle substantially perpendicular to and at adjustable distances from the valve surface of the pendulum thereof near the upper end at which the elongated mass is supported about the axis thereof.

18. Apparatus for supporting a load in a level condition as set forth in claim 14 further comprising volume booster means responsive to pressures in each of the passageways of said control means and independently regulating the flow of fluid from said source means to each of said mounts in accordance with a volume booster ratio greater than unity.

19. Apparatus for supporting a load in a level condition as set forth in claim 14 wherein each of said two points is at substantially the same distance from said first point, wherein said first pendulous control means is disposed nearer one of said mounts and said second pendulous control means is disposed nearer the other of said mounts at substantially the same distance from said first point, wherein said source means supplies air under pressure to said mounts, and wherein said means for supporting the load at said first point comprises an air-pressurized mount including control valve means preserving the load at a fixed height above the supporting structure at said first point.

References Cited by the Examiner

UNITED STATES PATENTS

| | | | |
|---|---|---|---|
| 2,408,169 | 9/1946 | Hoffer | 248—23 X |
| 2,507,900 | 5/1950 | Goetsch | 248—23 |

CLAUDE A. LE ROY, *Primary Examiner.*

JOHN PETO, *Examiner.*